(12) United States Patent
Goemans et al.

(10) Patent No.: US 7,121,309 B2
(45) Date of Patent: Oct. 17, 2006

(54) LOADING DEVICE

(75) Inventors: Piet Goemans, Zuidland (NL); Nico Tramper, Spijkenisse (NL)

(73) Assignee: Buchen-ICS BV, (NL)

( * ) Notice: Subject to any disclaimer, the term of this patent is extended or adjusted under 35 U.S.C. 154(b) by 0 days.

(21) Appl. No.: 11/018,104

(22) Filed: Dec. 21, 2004

(65) Prior Publication Data
US 2006/0054242 A1    Mar. 16, 2006

(30) Foreign Application Priority Data
Sep. 16, 2004    (DE)    ........................ 10 2004 045 346

(51) Int. Cl.
*B65B 1/04* (2006.01)
(52) U.S. Cl. .................... 141/237; 141/286; 141/67; 414/303
(58) Field of Classification Search ................ 141/67, 141/286, 234, 237, 331; 414/299, 303; 422/232, 422/145, 219
See application file for complete search history.

(56) References Cited

U.S. PATENT DOCUMENTS 3,223,490 A    12/1965    Sacken et al.
5,758,699 A *  6/1998    Haquet et al. .............. 141/286
6,880,591 B1 * 4/2005    Goemans et al. ........... 141/286

FOREIGN PATENT DOCUMENTS

| DE | 102 50 022 | 5/2004 |
|---|---|---|
| EP | 0116246 | 8/1984 |
| EP | 0 769 462 | 4/1997 |
| EP | 0 963 785 | 12/1999 |

* cited by examiner

*Primary Examiner*—Steven O. Douglas
(74) *Attorney, Agent, or Firm*—Cantor Colburn LLP

(57) ABSTRACT

The invention relates to a loading device for a reactor formed by of a plurality of tubes, which are substantially arranged vertically, substantially run parallel to each other and each have a filling opening. The loading device includes a plurality of funnel elements, through which the tubes can be loaded with bulk material, whereby the funnel elements are adapted to the reactor so that a substantially closed surface can be created with a plurality of funnel elements arranged side by side when the filling tubes extend into the tubes of the reactor through the filling openings. Furthermore, a pouring device for loading the tubes through the funnel elements is provided, whereby the pouring device is arranged above the funnel elements and lets the bulk material fall evenly rain-like onto all funnel elements.

9 Claims, 4 Drawing Sheets

Material of the Art

LOADING DEVICE

TECHNICAL FIELD OF INVENTION

The present invention relates to a loading device for a reactor made up of a plurality of tubes, which are arranged in a substantially vertical direction, extend substantially parallel to one another, each comprising a filling opening.

BRIEF DESCRIPTION OF RELATED ART

Such reactors are, for example, used as catalysts in catalytic processes occurring in the petrochemical industry. They consist of a plurality of vertically arranged tubes, which are held together by one or several support plates to form a tube bundle or pack. These tubes are filled with a catalytically active material, mostly in the form of powder or granules through filling openings which are formed by open ends of the tubes. During operation, the tube bundle is closed gas-tight inter alia by a bell followed by leading the respective reaction gas into the bell and then through the filling openings through the tubes. The contents of the tubes, i.e. for example the granules, then enable the desired reaction.

After a certain number of reactions, it is necessary to replace the contents of the tubes, i.e. the granules, and to refill the tubes. Care must be taken to ensure that the individual tubes receive the precise filling amount. Furthermore, any bridging between the spherules must be avoided during the filling process. Bridging occurs when several granule spherules pass the filling opening at the same time and get stuck against each other. This, in turn, causes an insufficient filling of the respective tube.

The simplest filling method is the separate filling of each individual tube. However, this is unacceptable due to the long filling time required.

Therefore, a large number of different methods and devices for fast and simple filling of granules into the tubes have been developed. For example, U.S. Pat. No. 3,223,490 discloses a filling device for a catalyst. This device consists substantially of a pan-like plate comprising a plurality of holes having diameters smaller than the filling openings through which the filling is performed. The plate is arranged above the tube ends of the reactor and is displaceable across a surface defined by the ends of all tubes. The distance between the holes in the plate is adapted to match the distance of the filling openings. It is thus possible to pour granules onto the plate and to fill several tubes simultaneously. In this case, the diameter of the holes is smaller than the diameter of the filling openings to avoid bridging. The device is relatively large and bulky which is especially disadvantageous when the reactor is of a gas-tight type. Prior to each filling process, the bell has to be removed in order to install the entire device. Further, expensive positioning is required to arrange the holes exactly above the filling openings.

EP 0 116 246 describes a container filling device with solid particles, wherein a particle-like solid is distributed rain-like over the entire cross section of the container, thus over all tubes. For this purpose, a moveable device is installed beneath one of the equipment's chutes, which starts rotating by propulsion and which has flexible diverting elements of lower hardness, that divert the bulk material at different angles under the effect of gravity.

EP 0 769 462 shows a similar device, wherein diverting elements, which are arranged at different levels along a common shaft, are also installed. In this device too, the bulk material is conducted from above onto the diverting elements and from the latters distributed evenly over the whole cross section of the reactor resp. over all tubes.

The above mentioned devices substantially operate advantageously; however, they have the disadvantage that equal loading of all tubes is not always guaranteed. This can be attributed among other things to the above mentioned bridging. The differences in loading are usually measured following the loading process, preferably with a height or dynamic pressure measurement. The density of the load can be deduced from the combination of these two measuring procedures, i.e. the length of active material within the individual tubes. Small deviations in the quantity of active material resp. catalysts in the individual tubes are often for the reason critical that the total catalyst charge in a tube bundle reactor must be replaced if the first tubes do not reach their required minimum transposition of input product into output product any longer. The efficiency of the reactor becomes correspondingly lower and in extreme situations there can be risk of explosion if the input product in an insufficiently loaded tube is not totally transposed.

A further disadvantage of the described central devices, which provide rain-like distribution, is that a proportion of the bulk material does not fall directly into the tubes resp. filling openings, but also lands between the filling openings. So, bulk material partially remains between the tubes. This then has to be corrected manually later on.

On the other hand, EP-0 963 785 A1 shows a device formed of individual segments. These individual segments can be put by means of formed filling tubes onto the filling openings. A portion of each filling tube extends into each tube while the segments are supported by the tube ends. To provide sufficient support, the filling tubes are designed so as to be kept clamped in the tubes. To this end, they comprise ends tapering from the plate to their free ends and additional longitudinal slots. The diameter of the filling tubes is such that their free ends can easily be inserted into the tubes or their filling openings while then be clamped by sufficient pressure. The plates of the segments are designed accordingly and have dimensions adapted to the tubes so that they, when mounted adjacent to each other, form in their entirety a uniform surface like a parquet floor or penrose pattern. To this end, each of these segments has a polygonal plane surface.

The advantage of such segments is particularly that they can be manufactured cost-effectively and, when filling or refilling the tubes, be individually passed through a relatively small manhole into the inner part of the bell and inserted. No device according to U.S. Pat. No. 3,223,490 is required any more.

Similar segments are shown in DE 102 50 022 A1. These can also form a continuous surface as a whole, like a parquet floor, when they are used next to one another. However, these eye-like formed segments do not have straight edges or corners, except two tips. Therefore there is always a gap between the funnel elements, through which dust can be carried off. This is desirable, because the filling height of the tubes should only be determined by the quantity of the catalyst itself resp. by integer spherules. Without such a gap, dust can also get into the tubes and increase the quantity of catalyst material within the tubes. The curved outer contours of the funnel elements also cause that no barriers can be created, even if the funnel elements are not aligned exactly on a horizontal plane.

Nevertheless, both types of segments have a common disadvantage, i.e. that the reactor has to be loaded manually by a person. Besides this, loading also takes relatively long because, after filling, rests of the bulk material that was left on the segments have to be filled resp. swept into the filling openings. Bridging can also not be precluded for sure.

BRIEF SUMMARY OF THE INVENTION

The invention generally provides a loading device and a procedure for loading a reactor made of a plurality of tubes, which allow the reactor resp. the tubes to be loaded as quickly and as simply as possible. The filling device should be as cost-effective and easy to produce as possible. It is also essential that the loading device is designed in such a way that incorrect use for example by an untrained operator is almost impossible or at least minimized. It is also essential that the loading device is suitable for gas-tight sealed reactors. The loading device should be stable, loadable and easy to remove. The tubes should be loaded as evenly as possible.

According to the invention, this is achieved by a loading device for a reactor made of a plurality of tubes, which
 a) are substantially vertically arranged,
 b) substantially run parallel to each other,
 c) each have a filling opening, consisting of
  a) a plurality of funnel elements through which the tubes can be loaded with bulk material, whereby the funnel elements have
   a funnel wall, which is limited by a filling opening and an outlet opening and has a gradient,
   a filling tube moulded around the outlet opening with an outer diameter that is smaller than the inner diameter of one tube of the reactor,
   and whereby the funnel elements are adapted to the reactor so that a substantially closed surface like a parquet floor can be created with a plurality of funnel elements arranged side by side when the filling tubes extend into the reactor tubes through the filling openings,
  b) at least one pouring device for loading the tubes through the funnel elements, whereby the pouring device is arranged above the funnel elements and let the bulk material fall evenly rain-like onto all funnel elements.

According to the invention, the loading device thus comprises two central units. On the one hand, funnel elements through which the tubes are loadable with bulk material are provided; on the other hand, a pouring device that lets the bulk material fall rain-like on to the funnel elements is provided above the funnel elements. The invention solves in this way nearly all problems relating to the prior art. On the one hand, owing to the design of the funnels, the tubes can be filled quickly and safely and, on the other hand, no material can be left between the funnels, because the latter border to one another. A continuous surface of funnel openings is so created. The removal of particles of the bulk material left behind after the reactor has been loaded is no longer necessary. The pouring device, which pours rain-like, thereby ensures an even filling of all tubes and a correspondingly high density within the tubes filled. This is achieved, among other things, by the fact that the bulk material falls from a certain height more or less vertically into the funnel elements and builds up in a correspondingly high density within the tubes.

For the loading device according to the invention, all pouring devices, which allow an even distribution of the bulk material over the whole surface of the funnel elements used, can be taken into consideration. In particular, the prescription described in EP 0 116 246 has shown suitable, as well as the device described in EP 0 769 462 that is in principle suitable for use in accordance with the invention, both of these documents are herein incorporated by reference in their entirety.

Known pouring devices are substantially constructed in such a way that the bulk material comes into the pouring device from above and is then distributed by the latter. For example, on a shaft running vertically to the surface of the funnel elements that are arranged under it, diverting elements resp. diverting wings, which divert the trajectory of the bulk material that falls on it and convey it outward, can be provided. An even distribution can be ensured by the length and angle of gradient of the diverting elements. Alternatively, it is also possible to throw the bulk material pneumatically out of openings, whereby the throw range can be determined by the air pressure. For example, the ejection opening can rotate around a shaft that runs vertically to the surface of the funnel elements resp. rotate with this shaft. So, several openings, but also only one opening, can be provided.

Advantageously, the pouring device is designed in such a way that it can also be used when it is not arranged centrally over the surface to be poured. As a matter of fact, it is often not possible to arrange the pouring device centrally; it rather has to be attached eccentrically above the funnel elements. In this case, it is necessary for the pouring device to distribute the bulk material in such a way that a part of the bulk material comes via another throw parabola into the funnel elements that are a bit more far away, while some bulk material can fall via a smaller throw parabola into the tubes that are close. It is essential, that the consecutive trajectory up to the tubes that are further away is compensated for by a more important ejection of bulk material, so that the tubes that are close are not already filled before the tubes that are further away have been completely filled.

Thus, according to the present invention, the combination of pouring devices with individual funnel elements joins all advantages of both systems and avoids the disadvantages associated with the single solutions. In addition, the funnel elements even represent a further development of the known non-funnel leading segments.

In a particularly advantageous embodiment, the undesirable bridging is also reduced by the fact that the diameter of the outlet openings of the funnel elements is smaller than the inner diameter of the filling tubes. This way, the flow rate of the bulk material is limited, whereby individual particles get more time to position or settle themselves within the tube. For this purpose, the outlet opening can be reduced in size by means of a circular inward protrusion. This protrusion can substantially run parallel to the outlet opening; however, it can also run for example diagonally funnel-like towards the filling tube. So, in the latter case, the funnel element has, as it were, two funnel areas: the funnel area between the load opening and the outlet opening and the funnel area formed by the funnel shaped constriction.

This cross-sectional constriction has an effect on the loading speed and the filling density of the tubes. The opening is particularly advantageous with regard to these features when the diameter of the opening amounts to approximately 70% of the diameter of the filling tube. But this value is meant as a guiding value and can be adjusted to suit individual circumstances and the granules used for filling.

The gradient of the inner wall of the funnel element is preferably adapted to the pouring angle of the bulk material. The pouring angle corresponds to the natural angle of slope that occurs independently when the bulk material is dumped or poured out. This slope according to the present invention additionally results in an optimal tube loading rate. The bulk material is therefore filled into the tube according to its natural pouring angle, ensuring an optimal loading density of the tubes.

In another advantageous embodiment, the funnel elements have a side wall that is moulded onto the outer part of the funnel elements and extends towards the tube to be filled. These side walls have such a length that they can brace, when the funnel element is in use, with a support plate of the reactor. This side wall leads to considerable advantages of a clamping connection of the filling tube in the tube. The side wall braces with a support plate that holds the reactor tubes and through which tube end areas extend with their filling openings.

The height of the side wall is selected so that tolerances of the tube ends that extend through the upper support plate can be compensated. This means that the tube ends with their upper edges do not reach the outer surface of the funnel wall. This has the advantage that, when the tubes are not cut clean and straight, differing heights and/or inclinations can occur in the funnel elements and on the other hand cause projecting edges between the funnel elements. This is made impossible by the support according to the invention over the side walls on the horizontally extending support plate. The support plate is the most favourable reference surface for support resp. for the creation of a substantially continuous closed surface. The side wall is also favourable because, under certain circumstances, an operator will walk on the funnel elements and, therefore, considerable forces are applied to the funnel elements. Through the bracing with the side wall on the support plate, these forces are ideally distributed and undesirable hindrances of the filling tubes of the tubes do not occur.

Despite this surely advantageous design, one may also use funnel elements that can be fixed by means of the filling tubes in the tubes and that do not have any side walls.

Additionally, the form of the funnel elements in plan view can be selected at discretion as long as a closed surface results when these funnel elements are inserted into the tubes. Polygonal or eye-like form are however particularly suitable.

In the case of the latter, the funnel elements each form in a plan view of the load openings a circular form with diametrically opposed noses that are moulded to it. The noses in turn form tips that are arranged on an axis that runs through a central point in the circular form, whereby the noses each form an isosceles triangle, which is limited each by two turning points in the outer contour of the circular form and by the respective tips, and whose sides each have an equal curvature towards the center point of the triangle. So, the sides of the isosceles triangle that border the tip have a curvature which corresponds in value to the curvature of the circular form.

This form enables the formation of a continuous surface by means of the funnel elements, without tips or corners having to be aligned against each other. Only circular sections fit closely together, while the moulded noses only close the spaces between the circular basic forms. Positioning resp. insertion of the funnel elements can thus be carried out very easily and quickly.

Thanks to the eye-like form, a deliberately selected gap between the funnel elements cannot be closed even by turning individual funnel elements. This is a direct result of the curved outer contours. Thus, dust can be safely removed even when the funnel elements are turned towards each other. It has shown that this advantage has a considerable influence on the exact filling of the reactor tubes.

In addition to this, the curved outer contours of the funnel elements result in that no hindrances can occur even when the funnel elements are not aligned exactly in a horizontal plane. The grains of the catalyst material are not held but diverted along the curvature.

It is emphasized that the wording "substantially closed surface" means that between the individual funnel elements, there is always a certain gap for removal of dust, i.e. even when the funnel elements are correctly inserted into the tube ends.

The load opening and the outlet opening are preferably circular.

It is further possible that several funnel elements be combined to form a one-piece component, i.e. this component has a plurality of load openings and is designed in such a way that, according to individual funnel elements, it can be combined with other components or also individual funnel elements to form a substantially closed surface Since reactor tubes generally have welded joints that extend along the tubes and project into the tubes, the filling tubes of the funnel elements according to the invention have on their outer walls, opposite the outer periphery, at least one, preferably three protrusions distributed on the outer periphery and that run longitudinally referring to the filling tube. These protrusions jut out of the outer wall of the filling tube in such a way that, between the outer wall of the filling tube and the inner wall, enough room is created for the welded joint, so that the latter cannot press against the outer wall of the filling tube. This could lead to an undesirable clamping and prevent a complete insertion of the segments resp. their filling tubes.

A similar problem arises when the tube ends of the reactor do not protrude beyond a support plate but are directly welded to the latter. In case of reactors of this design, these annular welds often also project towards the interior of the tubes. The resulting problem is the same as the one described above and can also be solved by the funnel elements according to the invention.

Unwanted clamping is thus prevented. When inserting the loading elements, care must only be taken to avoid collisions of the protrusions with the welded joint.

Although the welded joints of the reactor tubes substantially more or less show in one direction, this alignment is not always exact, so that the length of the welded joint can vary by a few degrees. For example, when inserting the first funnel element, care can be taken to ensure that the welded joint is arranged on the outer periphery of the funnel element at a maximum distance from the protrusions, i.e. centred between two protrusions. Thus, the position of the welded joints of the following tubes can, when using three protrusions, be arranged offset at 60° in both directions relating to the first welded joint. With eye-like formed funnel elements, the user only has two options and therefore a correspondingly low risk of a collision. If a collision occurs on first insertion, the user just has to turn the funnel element by 180°, a second collision is precluded, further unsuccessful attempts are not possible.

In an advantageous embodiment, the filling tube in the area of its free end a smaller diameter than at its base, i.e. in the area of the plate. This makes it easier to insert it into the filling opening of the tube.

In the following description of figures and the claims is a more detailed description of the invention. Thereby, the embodiment represented is just meant as an example and does not limit the scope of the invention.

BRIEF DESCRIPTION OF THE DRAWINGS

Referring now to the drawings wherein like elements are numbered alike in the several FIGURES.

DETAILED DESCRIPTION OF THE INVENTION

Figure 1:
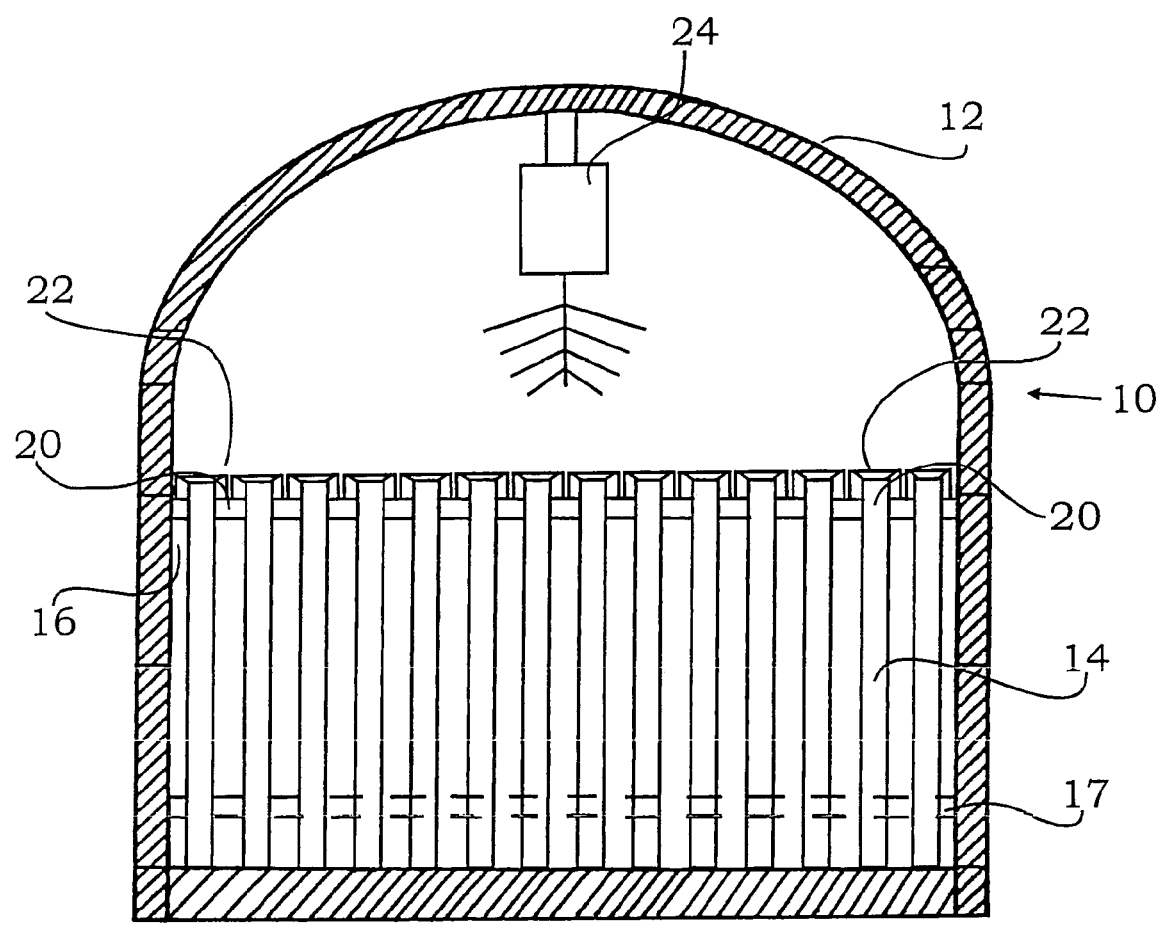
FIG. 1: a bloc diagram of a loading device according to the invention, composed of individual funnel elements and a pouring device.

FIG. 1 explains the functional mode of a loading device 10 according to the invention within a reactor 12 with tubes 14. In the present example, the latter are held by a retaining base 16, through which the tubes 14 extend. Also shown is a lower retaining base 17, through which the tubes 16 also extend. Funnel elements 22 are arranged on tube ends 20 of the tubes 14. In plan view (not visible in FIG. 1), these form a closed surface. Above the funnel elements 22 is shown a pouring device 24, from which the bulk material falls rain-like on to the funnel elements 22. The rain-like distribution of the bulk material is indicated by the arrows. At this point it is emphasized that FIG. 1 is only a bloc diagram. The reactor 12, the tubes 14, the funnel elements 22 and the pouring device 24 only are symbolic representations.

Figure 2:
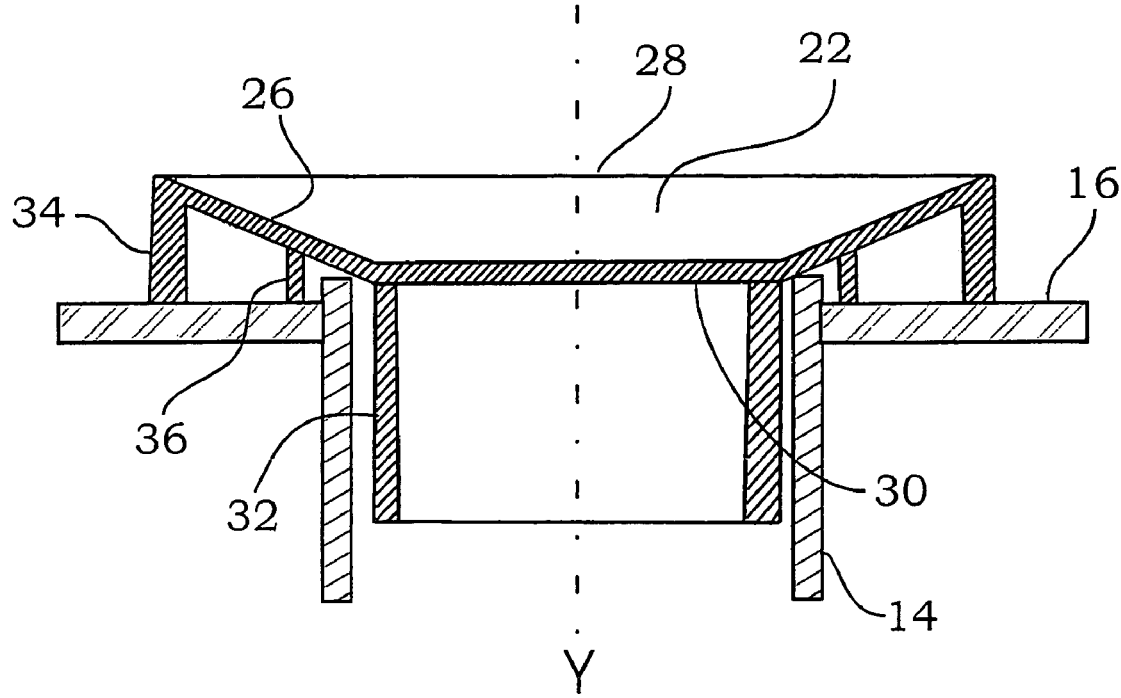
FIG. 2: a section of a funnel element according to the invention.
Figure 3:
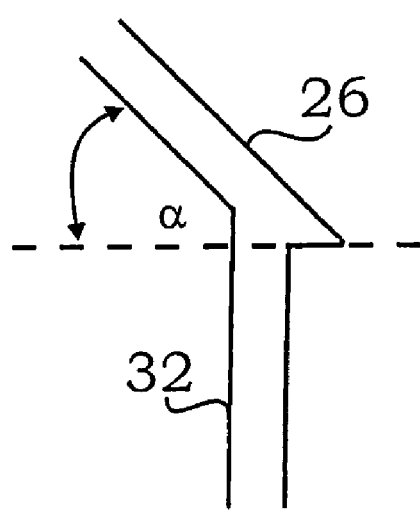
FIG. 3: an enlarged view of a section from FIG. 2, FIG. 4: the funnel element from FIG. 2 from above.

FIG. 2 shows a sectional view of a funnel element according to the invention. This has a funnel wall 26, which is limited by a filling opening 28, which are turned to face the pouring device 24 and an outlet opening 30, which is each turned to face a tube 14. A filling tube 32 is attached to the funnel wall 26, which can be inserted into a tube 14 for the loading process. In addition, a side wall 34, which is attached to an outside of the funnel wall 26, is visible. This can brace with the retaining base 16 so that the filling tube 32 does not have to be held by clamping in the tube 14. Furthermore, an auxiliary wall 36, which runs parallel to side wall 34, is visible. The funnel wall 36 has a gradient α (see FIG. 3). The gradient α can be advantageously determined depending on the bulk material and ideally corresponds to the pouring angle of the bulk material.

As FIG. 2 further shows, the diameter D1 of the outlet opening 30 is smaller than the diameter D2 of the filling opening 18. This is achieved in the represented example by a circumferential protrusion 48.

Figure 4:
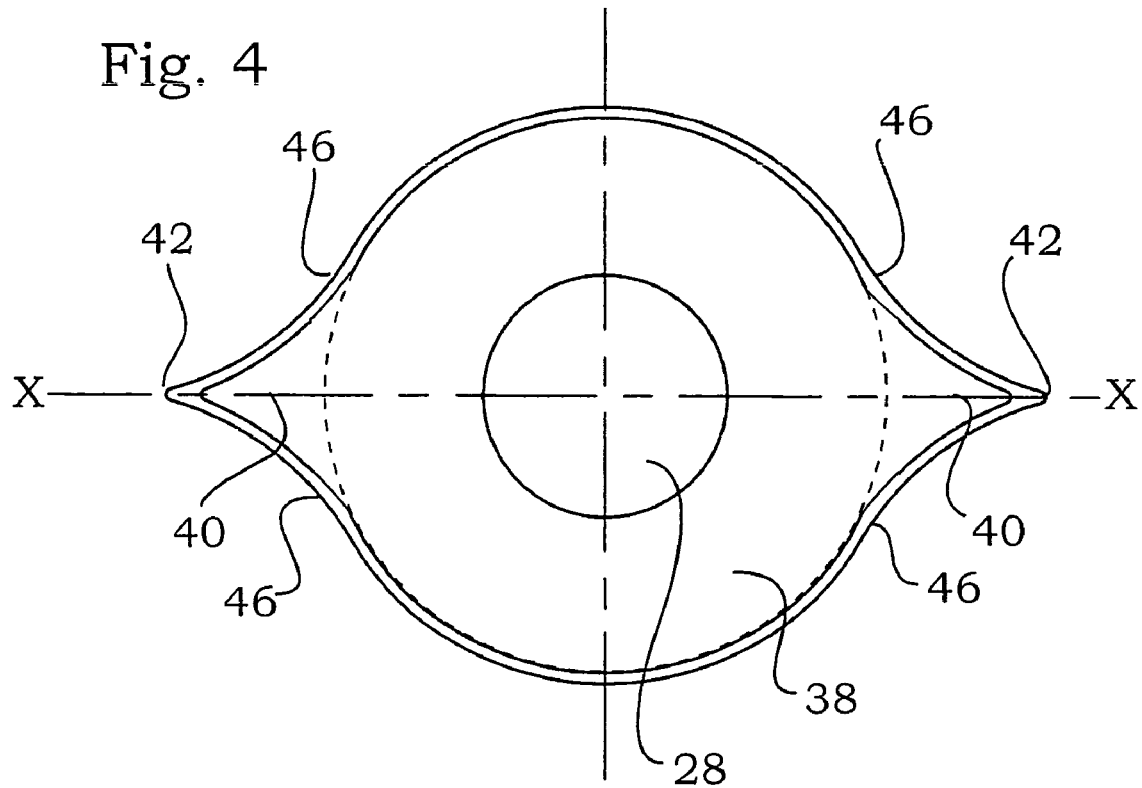

FIG. 4 shows the funnel element 22 of FIG. 2 from above. As an example, a so-called eye-like form is shown here. In a plan view from above, the funnel elements have a basic circular form 38 (indicated by dashed lines), to which diametrically opposed noses 40, which each have a tip 42, are attached. The tips 42 each lie on an axis X—X, which extends through a centre point 44 of the circular form 38. Starting from the circular form 38, both noses 40 each begin at turning points 46 and form isosceles triangles, the sides of which have the same curvature towards the centre point of the corresponding triangle. When inserted, the load opening 28, which is also visible, is above resp. coincides with a filling opening 18 of a tube 14.

Figure 5:
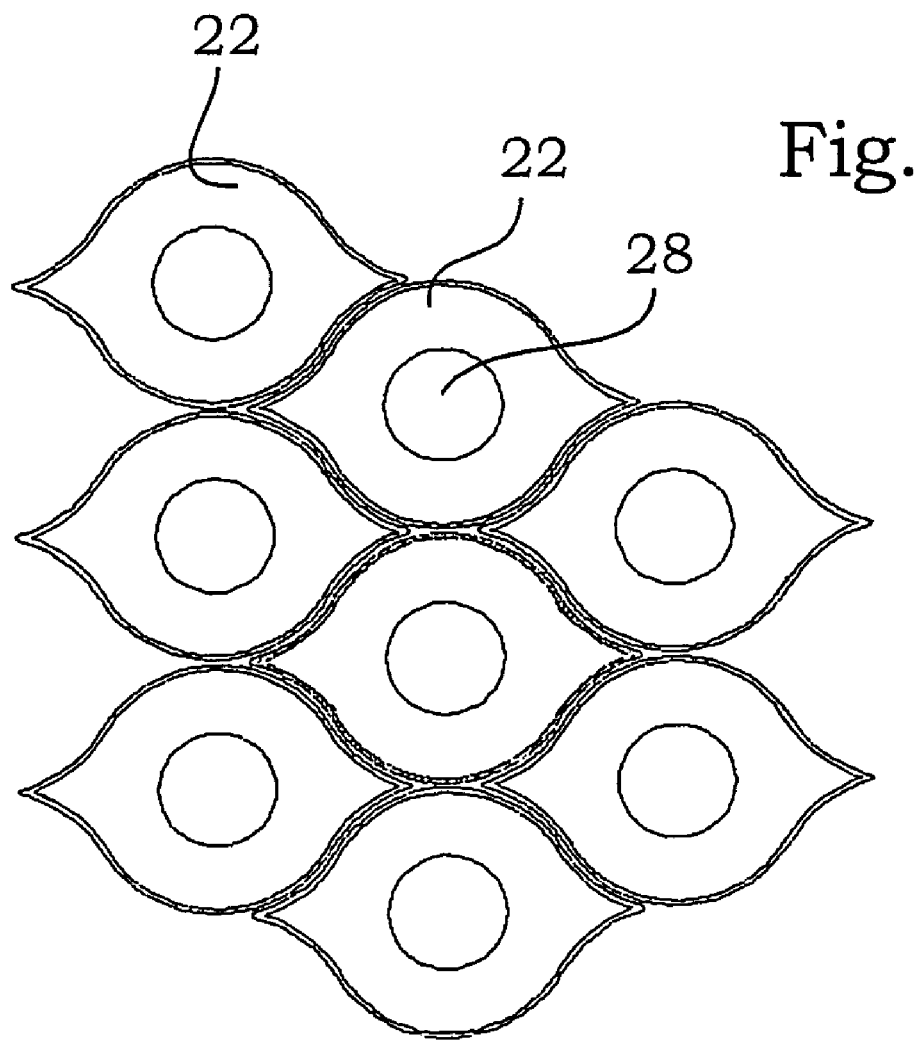
FIG. 5: several funnel elements from above.

FIG. 5 illustrates that several funnel elements 22 form a substantially closed surface.

Figure 6:
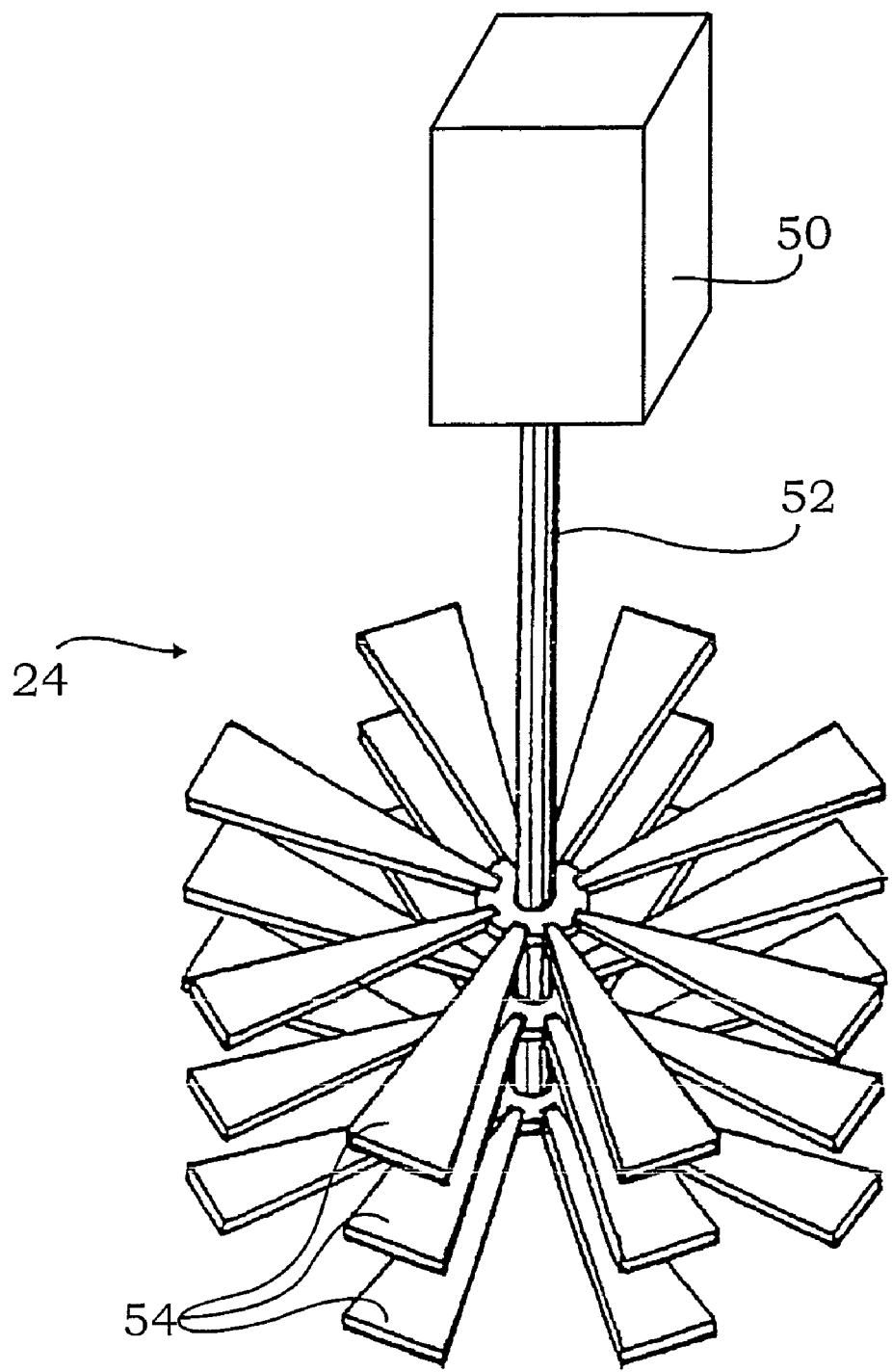
FIG. 6: a perspective view of a pouring device (state of the art).

FIG. 6 shows as an example a pouring device 24 suitable for the loading device according to the invention. This pouring device has a container 50 for the bulk material. Underneath the container, a rotatable shaft 52, which usually runs parallel to the tubes 14, is shown. Wings 54 extend from this rotatable shaft 52, the width of which increases towards their free ends. These wings 54 are put into rotation by the rotation of the shaft 52 and distribute bulk material that falls evenly onto them through deviation of the trajectory from the container 50 via the funnel elements 22 that hare arranged underneath the wings 54. Instead of the pouring device 24 shown, all other pouring devices are also suitable, providing that they effect a rain-like distribution of the bulk material.

The invention is not restricted to the examples described and shown but includes all implementations that have the same effect as defined by the invention. According to the invention, the funnel elements 22 can also be formed by a plurality of the individual elements described. This means that it can be advantageous not to manufacture individual eye-like forms resp. funnel elements 22, but to put together 2, 3 or more individual funnel elements and to manufacture them to a unique form. The basic form of such a multi-plate thus results from the individual funnel elements 22 and may differ depending on the number and arrangement of the individual funnel elements 22 relating to each other. Such multi-plates have only one side wall 34 along the outer periphery and have the advantage that they can be manufactured at a more reasonable price.

Furthermore, the side walls 34 can have protrusions on the front faces of their free ends, so that they are not in contact with the entire front faces with the retaining base 16, but only with the protrusions. This is advantageous if the retaining base 16 is dirty. According to the invention, three protrusions are provided, since this will preclude wobbling or tilting of the funnel elements 10.

The invention claimed is:

1. Loading device for a reactor made up of a plurality of tubes, which are arranged in a substantially vertical direction, extend substantially parallel to one another, and each comprise a filling opening, the device comprising:
   a plurality of funnel elements through which the tubes can be loaded with bulk material, each funnel elements comprising:
      a funnel wall, which is limited by a filling opening and an outlet opening and which has a gradient, and
      a filling tube molded around the outlet opening with an outer diameter that is smaller than an inner diameter of one tube of the reactor,
   wherein the funnel elements are adapted to the reactor so that a substantially closed surface is created by a plurality of funnel elements arranged side by side when the filling tubes extend into the reactor tubes through the filling openings;
   wherein a diameter of the outlet openings of the funnel elements is smaller than an inner diameter of the filling tube; and
   wherein the gradient of the funnel wall is adapted to a pouring angle of the bulk material; and
   at least one pouring device for loading the tubes through the runnel elements, wherein the pouring device is arranged above the funnel elements and lets the bulk material fall evenly rain-like onto all funnel elements.

2. Loading device according to claim 1, wherein a diameter of the outlet opening of the funnel element is smaller than the inner diameter of the filling tube.

3. Loading device according to claim 1, further comprising a side wall molded onto an outer pail of the funnel element which extends towards the tube to be filled and has such a length that enables it to brace, when the funnel element is in use, with a support plate of the reactor.

4. Loading device according to claim 1, wherein the gradient of the funnel wall corresponds roughly to a pouring cone of the bulk material.

5. Loading device according to claim 1, wherein the funnel elements in plan view of the load opening each have a polygonal outer dimension.

6. Loading device according to claim 1, wherein the funnel elements in plan view of the load opening each form a circular form with diametrically opposed molded noses, wherein the noses form tips that are arranged on an axis that runs through a center point in the circular form and wherein the noses each form an isosceles triangle, which is limited each by two turning points in an outer contour of the circular form and by the respective tip, and whose sides each have an equal curvature towards the center point of the triangle.

7. Loading device according to claim 1, wherein the funnel elements are formed by a plurality of individual plates so that a funnel element has several openings and correspondingly several filling tubes.

8. Loading device according to claim 1, wherein the filling tube on an outer periphery has at least one protrusion that substantially runs longitudinally with respect to the filling tube.

9. Process of forming a reactor made up of a plurality of tubes, which are arranged in a substantially vertical direction, extend substantially parallel to one another, and each comprises a filling opening, the process comprising:

attaching the funnel elements according to claim 1, on the filling openings so that a closed surface is formed; and distributing in rain-like manner bulk material from above onto the funnel elements with a pouring device.

* * * * *